United States Patent [19]

Harwath

[11] Patent Number: 4,728,271
[45] Date of Patent: Mar. 1, 1988

[54] GEAR PUMP WITH IMPROVED PINION MOUNTING

[75] Inventor: Frank L. Harwath, Rockford, Ill.

[73] Assignee: Suntec Industries Incorporated, Rockford, Ill.

[21] Appl. No.: 902,938

[22] Filed: Sep. 2, 1986

[51] Int. Cl.⁴ ............................................. F04C 18/02
[52] U.S. Cl. ........................................ 418/9; 418/200; 418/206; 403/248
[58] Field of Search .................... 418/9, 206, 200; 403/248, 354, 356, 358

[56] References Cited

U.S. PATENT DOCUMENTS

| | | | |
|---|---|---|---|
| 1,439,769 | 12/1922 | Smith | 403/248 |
| 1,689,673 | 10/1928 | Lalor | 418/9 |
| 3,056,618 | 10/1962 | Andersen | 403/354 |
| 3,378,285 | 4/1968 | Staley | 403/358 |
| 4,171,939 | 10/1979 | Harwath | 403/354 |
| 4,391,580 | 7/1983 | Hunsberger et al. | 431/1 |

FOREIGN PATENT DOCUMENTS 516209  9/1955  Canada ............................. 403/356

OTHER PUBLICATIONS

Engineering Drawing Identified by the Date Stamp "Michael C. Payden, Dec. 16, 1986".

*Primary Examiner*—Carlton R. Croyle
*Assistant Examiner*—Jane E. Obee
*Attorney, Agent, or Firm*—Leydig, Voit & Mayer, Ltd.

[57] ABSTRACT

A two-stage gear pump with two gear sets each having a pinion telescoped onto a slotted drive shaft with a press fit and also positively keyed to the shaft. One key in the slot of the shaft includes radial ears establishing a positive coupling between the shaft and one of the pinions and also includes cantilevered spring fingers which enhance the press fit between the shaft and the other pinion.

8 Claims, 6 Drawing Figures

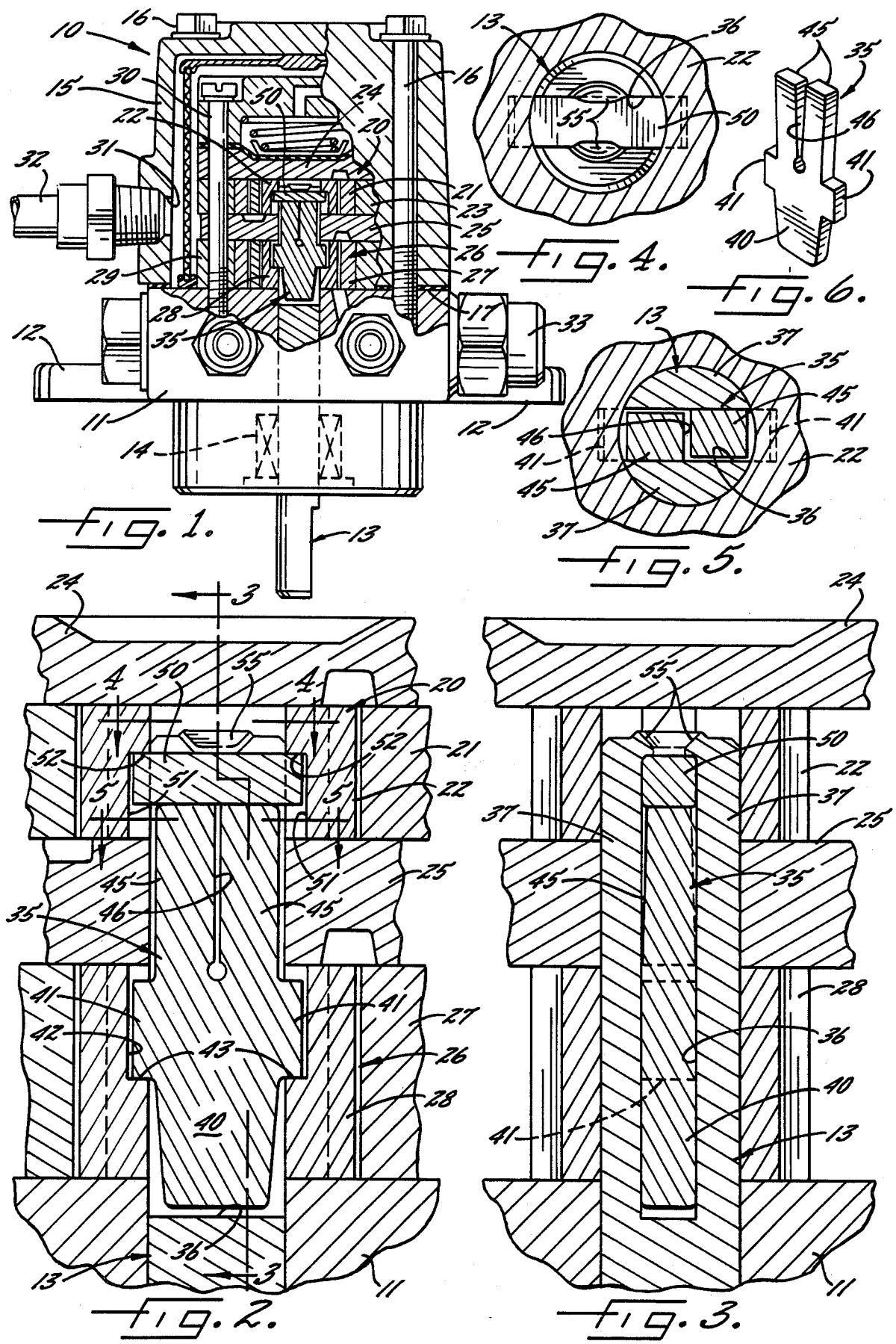

GEAR PUMP WITH IMPROVED PINION MOUNTING

BACKGROUND OF THE INVENTION

This invention relates to a gear pump of the type which is especially adapted to supply pressurized liquid fuel to an oil burner. The invention more particularly relates to a two-stage gear pump.

In such a gear pump, each stage comprises a pinion gear secured to a drive shaft and rotatable within a ring gear. It is conventional to couple the pinions to the shaft with keys which transmit the drive to the pinions.

Fuel pumps of the above type typically operate with low viscosity, low lubricity fuels. As a result of the low lubricity, prior two-stage gear pumps experience wear at the interfaces of the keys with the pinions and the drive shaft. Such wear eventually permits relative rotation between the pinions and the shaft and this leads to additional wear which reduces or destroys the effectiveness of the coupling between the pinions and the shaft.

SUMMARY OF THE INVENTION

The general aim of the present invention is to provide a new and improved gear pump, and particularly a two-stage pump, in which the pinions are attached to the drive shaft in a unique manner significantly reducing the wear which otherwise occurs during start-up, shut-down and operation of the pump.

A more detailed object of the invention is to attach the two pinions to the drive shaft with a tight press fit while positively coupling one pinion to the shaft with a novel key which also serves to enhance the press fit of the other pinion on the shaft. A second key acts to positively couple the latter pinion to the shaft.

The invention also resides in the novel coaction of spring fingers on one of the keys with a slot of uniform width in the drive shaft.

Another object of the invention is to provide a two-stage gear pump which may be manufactured and assembled in a comparatively simple and inexpensive manner.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved gear pump incorporating the unique features of the present invention, certain parts of the pump being broken away and shown in section.

FIG. 2 is an enlarged view of certain parts shown in FIG. 1.

FIGS. 3, 4 and 5 are fragmentary cross-sections taken substantially along the lines 3—3, 4—4 and 5—5, respectively, of FIG. 2.

FIG. 6 is a perspective view of one of the keys.

DETAILED DESCRIPTION OF THE PREFERRED EMBODIMENT

For purposes of illustration, the invention has been shown in the drawings as embodied in a gear pump 10 of the type which is widely used for delivering fuel oil from a tank (not shown) and supplying the fuel under pressure to an oil burner (not shown). The constructional and operational features of the pump from a hydraulic standpoint are well known and need not be described in detail.

Briefly, the pump 10 includes a body comprising a first member 11 formed by a casting having ears 12 for mounting the pump. A drive shaft 13 extends through the casting 11 and is rotatably supported in the casting. The outer end portion of the shaft projects outwardly from the outer end of the casting and is adapted to be connected to a drive motor (not shown).

Disposed in face-to-face relation with the other end of the casting 11 is a second member 15 which is generally in the form of a housing detachably secured to the casting 11 by screws 16. A gasket 17 establishes a fluid-tight seal at the interface of the casting 11 and the housing 15.

Located within the housing 15 is a first stage gear set 20 having a ring gear 21 and a pinion gear 22 similar to the gears of the pump disclosed in Hunsberger et al U.S. Pat. No. 4,391,580, the pinion being fixed to and rotatable with the free or inner end portion of the drive shaft 13. The ring gear is surrounded by a stationary spacer ring 23 which is sandwiched between an upper end plate 24 and a lower spacer plate 25.

A second stage gear set 26 is located within the housing 15 beneath the spacer plate 25 and includes a ring gear 27 which encircles a pinion gear 28. The pinion 28 is fixed to and is rotatable with the shaft 13 while the ring gear 27 is surrounded by a spacer ring 29 which is sandwiched between the casting 11 and the spacer plate 25. Screws 30 secure the end plate 24, the spacer ring 23, the spacer plate 25 and the spacer ring 29 to the casting 11.

When the drive shaft 13 is rotated, fuel from the tank is sucked into the pump 10 by the gear sets 20 and 26 via an inlet port 31 formed in the housing 15 and connected to a supply line 32. Pressurized fuel is delivered to the oil burner by way of an outlet or nozzle port 33 associated with the casting 11 and located on the side of the pump opposite the inlet port 31. The fuel is pressurized by virtue of the pinions 22 and 28 rotating within the ring gears 21 and 27, respectively.

The present invention contemplates the provision of new and improved means for connecting each of the pinions 22 and 28 to the drive shaft 13 both with a press fit and with a positive coupling and in a manner which substantially reduces wear that normally occurs at the drive interfaces between the pinions and the shaft. Moreover, the present invention enables relatively easy and inexpensive manufacture and assembly of the driving components of the pump 10.

Specifically, the aforementioned means comprise an axially elongated element or key 35 which fits in a simple slot 36 in the shaft 13 and which not only serves to positively couple the pinion 28 to the shaft but also to permit and enhance a press fit between the pinion 22 and the shaft. As shown most clearly in FIGS. 3 and 5, the slot 36 is rectangular in cross-section, is formed radially through the inner end portion of the shaft, opens axially out of the inner end of the shaft and extends axially in an outward direction to a point located outwardly beyond the pinion 28. The slot is of constant width throughout its length.

As a result of the slot 36, the inner end portion of the shaft 13 is divided into two cantilevered halves 37 (FIGS. 3 and 5). Pursuant to the invention, the pinion 28 is telescoped onto the shaft with a press fit and, because of the slot 36, the two cantilevered halves 37 of the shaft may yield radially to permit the pinion to be pressed tightly onto the shaft without splitting the pinion even though there is a wide range of tolerance variations between the shaft and the pinion.

Torque normally is transmitted between the shaft 13 and the pinion 28 by virtue of the press fit and thus there usually is no relative rotation between the pinion and the shaft. The key 35, however, coacts between the shaft 13 and the pinion 28 to transmit torque if the pump 10 should require torque beyond the capability of the press fit; as might occur, for example, during start-up and shut-down of the pump. For this purpose, the key 35 includes a flat tongue-like outer portion 40 disposed in the outer end portion of the slot 36 and further includes a pair of ear portions 41 projecting radially outwardly from the shaft 13. As shown in FIG. 2, the ears 41 extend into diametrically opposed slots or keyways 42 formed in the inner periphery of the pinion 28. The keyways open axially out of the inner end of the pinion 28 and terminate as axially inwardly facing shoulders 43 located near the outer end of the pinion 28. The shoulders 43 engage the outer ends of the ears 41 and prevent the outer end of the key 35 from bottoming against the slot 36.

In carrying out the invention, the inner end portion of the key 35 is formed with two spring fingers 45 which bear against opposite sides of the slot 36 and spread the two cantilevered halves 37 of the shaft 13 away from one another to enable the pinion 22 also to be telescoped onto the shaft with a tight press fit without splitting the pinion. To these ends, the key 35 is made of resiliently yieldable steel and is formed with a slot 46 (FIG. 2) which extends from the extreme inner end of the key to a point just short of the ears 41. The slot 46 extends completely through the narrow dimension of the key 35 and causes the two cantilevered fingers 45 to be defined at the inner end portion of the key.

During formation of the key 35, one of the fingers 45 is sprung outwardly in one direction while the other finger is sprung outwardly in the opposite direction as shown in FIGS. 5 and 6 so as to make the effective narrow dimension of the key slightly greater than the width of the slot 36. When the key is inserted into the slot 36, the fingers 45 are flexed inwardly and thereafter press resiliently against the sides of the slot 36 so as to spread the two shaft halves 37 away from one another. As a result of the slot 36 and the fingers 45, the shaft 13 may be compressed radially to allow the pinion 22 to be pressed onto the shaft and thereafter the fingers urge the two halves 37 of the shaft outwardly against the inner periphery of the pinion 22 to help insure a tight fit between the shaft and the pinion. The fingers effect such a tight fit even though the nominal diameter of the shaft may have been reduced somewhat by virtue of the pinion 28 having been pressed onto the shaft.

The pump 10 is completed by a square key 50 which extends radially through the slot 36 near the extreme inner end of the shaft 13. The key 50 fits within diametrically opposed keyways 51 (FIG. 2) in the inner periphery of the pinion 22 and is trapped between the outer end of the key 35 and axially outwardly facing shoulders 52 defined at the inner ends of the keyways 52. In addition, the key is staked in place by a hot upset 55 which is formed by ramming an electrode downwardly against the center portion of the inner end of the shaft 13 to swage the metal adjacent the open end of the slot 36 over against the key 50. When the pump 10 is subjected to high torque, the key 50 augments the press fit between the shaft 13 and the pinion 22 and forms a positive coupling for carrying torque which is beyond the capability of the press fit.

The pinions 22 and 28 are assembled with the shaft 13 by first pressing the pinion 28 onto the inner end portion of the shaft while the key 35 is disposed inside of and is preassembled with the pinion 28, the key 35 thus entering the slot 36 in the shaft. Thereafter, the hot upset 55 is formed on the end of the shaft. After the spacer plate 25 has been slipped over the shaft, the square key 50 is installed in the space between the spacer plate and the upset 55. Finally, the pinion 22 is pressed onto the shaft to complete the assembly.

From the foregoing, it will be apparent that the present invention brings to the art a new and improved gear pump 10 in which the pinions 22 and 28 are both press fit on and positively keyed to the shaft 13 with the key 35 serving to positively couple the pinion 28 to the shaft while also spreading the shaft to insure a tight press fit of the pinion 22. As a result of the unique mounting arrangement, relative motion between the pinions and the shaft is virtually eliminated so as to reduce wear at the interfaces between the pinions and the shaft and to prolong the service life of the pump. In addition, the coaction of the key 50 with the pinion 22 and the key 35 prevents the shaft from being rammed endwise against the end plate 24 in the event that a force of significant magnitude is applied to the outer end of the shaft. Since the slot 36 in the shaft 13 is of uniform width throughout its length, the slot can be formed by a simple milling operation.

I claim:

1. A gear pump comprising a body, an elongated shaft rotatably supported by said body and having an axially facing free end, a pinion gear telescoped onto the free end portion of said shaft with a press fit, a slot formed radially through the free end portion of said shaft and opening axially out of the free end of said shaft, said slot extending along said shaft from the free end thereof to a point beyond said gear and dividing the free end portion of said shaft into two cantilevered halves, an axially elongated element made of resiliently yieldable material disposed within said slot, a portion of said element being split axially and defining two cantilevered fingers projecting toward the free end of said shaft, said fingers pressing resiliently in opposite directions against opposite sides of said slot so as to resiliently spread the two halves of said shaft away from one another and enhance the press fit between said gear and said shaft, and means for captivating said element in said slot.

2. A gear pump as defined in claim 1 further including an additional pinion gear telescoped onto said shaft with a press fit and located further away from the free end of said shaft than said one gear, said elongated element comprising a key having means engageable with said additional gear to positively couple said additional gear and said shaft for rotation in unison, and an additional key captivated in said slot and engageable with said one gear to positively couple said one gear and said shaft for rotation in unison.

3. A gear pump comprising a body, an elongated shaft rotatably supported by said body and having an axially facing free end, first and second axially spaced pinion gears pressed tightly onto and rotatable with the free end portion of said shaft, said first gear being located further away from the free end of said shaft than said second gear, a radially and axially opening slot formed through the free end portion of said shaft and extending along said shaft at least to a point within said first gear, said slot dividing the free end portion of said shaft into two cantilevered halves, a first key disposed within said slot and having means engageable with said first gear to positively couple said first gear and said shaft for rotation in unison, said first key having resiliently yieldable means acting against the sides of said slot and resiliently spreading the two halves of said shaft away from one another to enhance the press fit, between said second gear and said shaft, and a second key disposed in said slot and having means engageable with said second gear to positively couple said second gear and said shaft for rotation in unison.

4. A gear pump as defined in claim 3 in which a portion of said first key is split axially, said resiliently yieldable means comprising cantilevered fingers projecting toward the free end of said shaft.

5. A gear pump comprising a body, an elongated metal shaft rotatably supported by said body and having an axially facing free end, first and second axially spaced pinion gears telescoped onto the free end portion of said shaft with a tight press fit, said first gear being located further away from the free end of said shaft than said second gear, a slot formed radially through the free end portion of said shaft and opening axially out of the free end of said shaft, said slot extending along said shaft at least to a point within said first gear and dividing the free end portion of said shaft into two cantilevered halves, an axially elongated first key disposed within said slot and having radially extending ears, keyways in said first gear and receiving said ears to positively couple said first gear and said shaft for rotation in unison, said key being made of resiliently yieldable material, a portion of said key being split axially and defining two cantilevered fingers projecting toward the free end of said shaft, said fingers pressing resiliently in opposite directions against opposite sides of said slot so as to resiliently spread the two halves of said shaft away from one another and enhance the press fit between said second gear and said shaft, a second key disposed in said slot and having means engageable with said second gear to positively couple said second gear and said shaft for rotation in unison, and means for captivating said second key in said slot.

6. A gear pump as defined in claim 5 in which one of said fingers extends outwardly of said first key in one direction and in which the other finger extends outwardly from the first key in the opposite direction prior to insertion of the first key into said slot.

7. A gear pump as defined in claim 5 further including a spacer located between said gears and rotatably receiving said shaft.

8. A gear pump as defined in claim 5 in which said slot is of substantially uniform width throughout its length.

* * * * *